US012569948B2

(12) United States Patent
Hong et al.

(10) Patent No.: US 12,569,948 B2
(45) Date of Patent: Mar. 10, 2026

(54) METHOD FOR USING HEAT DISSIPATION PLATE MANUFACTURING APPARATUS

(71) Applicant: Heat-Sol Corp., Incheon (KR)

(72) Inventors: Ji Un Hong, Wonju-si (KR); Sung Shin Baik, Incheon (KR)

(73) Assignee: Heat-Sol Corp., Incheon (KR)

( * ) Notice: Subject to any disclaimer, the term of this patent is extended or adjusted under 35 U.S.C. 154(b) by 0 days.

(21) Appl. No.: 18/956,352

(22) Filed: Nov. 22, 2024

(65) Prior Publication Data

US 2025/0196275 A1 Jun. 19, 2025

(30) Foreign Application Priority Data

Dec. 18, 2023 (KR) ........................ 10-2023-0184942

(51) Int. Cl.
*B23P 15/26* (2006.01)

(52) U.S. Cl.
CPC .................................... *B23P 15/26* (2013.01)

(58) Field of Classification Search
CPC .. B23P 15/26; H01L 21/4871; H01L 21/4878; F28F 3/048; B21J 5/068
See application file for complete search history.

(56) References Cited

FOREIGN PATENT DOCUMENTS

| JP | 2021-028969 A | 2/2021 |
|---|---|---|
| KR | 10-2377051 B1 | 3/2022 |

*Primary Examiner* — Lee A Holly
(74) *Attorney, Agent, or Firm* — Sughrue Mion, PLLC

(57) ABSTRACT

Proposed is a method for using a heat dissipation plate manufacturing apparatus. The method includes (A) setting a preliminary processing condition on the heat dissipation plate manufacturing apparatus, (B) performing a preliminary cutting processing to an object dedicated to heat dissipation on a sample seating part on the basis of the preliminary processing condition, (C) setting a processing condition on the heat dissipation plate manufacturing apparatus, (D) rotating the sample seating part on the basis of the processing condition, (E) performing zero point adjustment of the sample seating part, (F) performing a cutting processing on the object dedicated to heat dissipation on the basis of the processing condition, and (G) checking whether a final processing surface of the sample seating part has been reached by using the heat dissipation plate manufacturing apparatus.

23 Claims, 6 Drawing Sheets

METHOD FOR USING HEAT DISSIPATION PLATE MANUFACTURING APPARATUS

CROSS REFERENCE TO RELATED APPLICATION

The present application claims priority to Korean Patent Application No. 10-2023-0184942, filed Dec. 18, 2023, the entire contents of which are incorporated herein for all purposes by this reference.

BACKGROUND

Technical Field

The present disclosure relates to a method for using a heat dissipation plate manufacturing apparatus configured to manufacture an object dedicated to heat dissipation into a heat dissipation plate with grouped heat dissipation fins by processing the object dedicated to heat dissipation.

Description of the Related Art

Recently, a heat dissipation plate is manufactured to be attached to an inverter of an electric vehicle, to receive heat generated from the inverter, to evenly distribute the heat across the heat dissipation plate, and to facilitate heat dissipation into the air through water-cooled type heat dissipation or a cooling fan, thereby increasing the performance of the electric vehicle. To this end, the heat dissipation plate has a wide surface area, and has a structure capable of allowing wind that is blown from the cooling fan to pass through easily when the heat dissipation plate is coupled to the cooling fan.

According to a conventional technology, the heat dissipation plate has heat dissipation fins formed on a base plate by using a skiving device that is configured to cut an object. That is, the skipping device uses a cutting tool so as to cut the object, thereby forming the base plate from a portion of the object and forming the heat dissipation fins from the remaining portion of the object. Since the heat dissipation plate has the base plate and individual heat dissipation fins that are formed of the same material as the object, the heat dissipation plate does not have a contact thermal resistance between the base plate and the individual heat dissipation fins, so that heat flow may be maximized.

However, the skiving device repeatedly requires a user's intervention to measure or adjust an inclination of a bed before the object is seated on the bed, and repeatedly requires the user's intervention to adjust the inclination of the bed when a shape error occurs between processed heat dissipation fins and design-required heat dissipation fins on the bed after the object is seated. In addition, in order to adjust the inclination of the bed, the skiving device has a large and heavy bed with a complex structure around the bed.

Therefore, a method for using the skiving device requires a user's effort in handling the bed, and it is difficult to maintain the inclination of the bed constantly during a lifespan of the skiving device, so that a person skilled in using the skiving device is required.

SUMMARY

Accordingly, the present disclosure has been made keeping in mind the above problems occurring in the related art, and an objective of the present disclosure is to provide a method for using a heat dissipation plate manufacturing apparatus, the method being capable of minimizing a user's intervention in measuring and adjusting an inclination of a sample seating part before or after seating an object dedicated to heat dissipation, and the method being suitable for r minimizing the user's intervention in measuring a thickness, height, and pitch of heat dissipation fins in a heat dissipation plate with grouped heat dissipation fins even when determining whether an error occurs between a processed shape of the heat dissipation fins and a design-provided shape of the heat dissipation fins is performed.

According to the present disclosure, there is provided a method for using a heat dissipation plate manufacturing apparatus configured to manufacture an object dedicated to heat dissipation into a heat dissipation plate with grouped heat dissipation fins by processing the object dedicated to heat dissipation, the method including: (A) setting a preliminary processing condition on the heat dissipation plate manufacturing apparatus; (B) performing a preliminary cutting processing to the object dedicated to heat dissipation on a sample seating part by using the heat dissipation plate manufacturing apparatus on the basis of the preliminary processing condition; (C) setting a processing condition on the heat dissipation plate manufacturing apparatus; (D) rotating the sample seating part by using the heat dissipation plate manufacturing apparatus on the basis of the processing condition; (E) performing zero point adjustment of the sample seating part by using the heat dissipation plate manufacturing apparatus; (F) performing a cutting processing on the object dedicated to heat dissipation by using the heat dissipation plate manufacturing apparatus on the basis of the processing condition; and (G) checking whether a final processing surface of the sample seating part has been reached by using the heat dissipation plate manufacturing apparatus, wherein, in the cutting processing, the object dedicated to heat dissipation is formed into the heat dissipation plate with grouped heat dissipation fins.

The heat dissipation plate manufacturing apparatus may include: a base platform which is positioned on a lower side of the heat dissipation plate manufacturing apparatus and which extends horizontally; the sample seating part configured to be slid on the base platform along the base platform; a sliding platform which is positioned on an upper side of the heat dissipation plate manufacturing apparatus and which extends vertically with respect to the base platform; and a cutting mechanism part configured to be slid along the sliding platform, wherein the sample seating part and the cutting mechanism part may be configured to be gathered around an edge between the base platform and the sliding platform or to deviate from the edge during operating the heat dissipation plate manufacturing apparatus.

The sample seating part may include: a motor; and a seating platform which is formed in a polygonal shape and which is linked to a rotation of a rotation shaft of the motor. The setting of the preliminary processing condition may include: positioning the object dedicated to heat dissipation on the seating platform; inputting a condition probe thickness, a pitch specified in a design drawing, a height specified in the design drawing, a condition probe compression ratio, and a total number of condition probe fins into a user interface of the heat dissipation plate manufacturing apparatus; and tilting the seating platform at a first angle with respect to the base platform on the basis of the condition probe thickness, the pitch specified in the design drawing, and the condition probe compression ratio by using a controller of the heat dissipation plate manufacturing apparatus.

The condition probe thickness may be a one-time movement distance of the cutting mechanism part on the sliding platform, the pitch specified in the design drawing may be a one-time movement distance of the sample seating part on the base platform, and the condition probe thickness and the condition probe compression ratio may be secured from use experience data of the heat dissipation plate manufacturing apparatus.

The first angle may be derived from a following angle derivation formula within a calculation program in the controller of the heat dissipation plate manufacturing apparatus.

$$\theta 1 = \arctan(t1/p/\varepsilon 1)$$

(Here, t1 is the condition probe thickness, p is the pitch specified in the design drawing, and ε1 is the condition probe compression ratio.)

In a situation in which a seating platform is provided on the sample seating part, a cutting tool is provided on the cutting mechanism part, and a condition probe thickness, a pitch specified in a design drawing, a height specified in the design drawing, a condition probe compression ratio, and a total number of condition probe fins of a preliminary heat dissipation fin are input into a user interface of the heat dissipation plate manufacturing apparatus, the performing of the preliminary cutting processing may include: gathering the sample seating part and the cutting mechanism part around the edge between the base platform and the sliding platform by using a controller of the heat dissipation plate manufacturing apparatus; and forming a heat dissipation plate with partially grouped heat dissipation fins by cutting a portion of the object dedicated to heat dissipation according to the total number of condition probe fins by repeatedly bringing the cutting tool into contact with the object dedicated to heat dissipation on the seating platform by using the controller.

In a situation in which a seating platform is provided on the sample seating part, a cutting tool is provided on the cutting mechanism part, and a heat dissipation plate with partially grouped heat dissipation fins is formed from the object dedicated to heat dissipation provided on the seating platform, in the setting of the processing condition, in a state in which the cutting tool is brought into contact with an individual first heat dissipation fin among first heat dissipation fins positioned on a first heat dissipation substrate in the heat dissipation plate with partially grouped heat dissipation fins, a thickness of the individual first heat dissipation fin among the first heat dissipation fins in the heat dissipation plate with partially grouped heat dissipation fins may be measured by using a thickness sensor of the heat dissipation plate manufacturing apparatus, a penetration depth of a tip blade of the cutting tool under the individual first heat dissipation fin may be measured between the first heat dissipation substrate and the individual first heat dissipation fin by using the thickness sensor of the heat dissipation plate manufacturing apparatus, and a compression ratio of the object dedicated to heat dissipation may be derived in a controller of the heat dissipation plate manufacturing apparatus by receiving the thickness of the individual first heat dissipation fin and the penetration depth of the tip blade as numerical values from the thickness sensor.

The compression ratio may be derived from a following compression ratio derivation formula within a calculation program in the controller of the heat dissipation plate manufacturing apparatus.

$$\varepsilon 2 = t2/d$$

(Here, t2 is the thickness of the individual first heat dissipation fin, d is the penetration depth of the tip blade, and ε2 is the compression ratio of the object dedicated to heat dissipation.)

The method may further capturing the seating platform by using a camera of the heat dissipation plate manufacturing apparatus; and storing a total number of processing surfaces of the seating platform as a numerical value by receiving a captured image of the seating platform from the camera of the heat dissipation plate manufacturing apparatus.

In a situation in which a seating platform is provided on the sample seating part, a cutting tool is provided on the cutting mechanism part, and a compression ratio of the object dedicated to heat dissipation is derived in a controller of the heat dissipation plate manufacturing apparatus by receiving a thickness of an individual first heat dissipation fin and a penetration depth of a tip blade of the cutting tool as numerical values, in a state in which a pitch specified in a design drawing and a height specified in the design drawing are already input during performing the (A) process in the controller of the heat dissipation plate manufacturing apparatus, the rotating of the sample seating part may include: tilting the seating platform at a second angle by using the controller of the heat dissipation plate manufacturing apparatus on the basis of the pitch specified in the design drawing, the thickness of the individual first heat dissipation fin, and the compression ratio of the object dedicated to heat dissipation.

The second angle may be derived from a following angle derivation formula within a calculation program in the controller of the heat dissipation plate manufacturing apparatus.

$$\theta 2 = \arctan(t2/p/\varepsilon 2)$$

(Here, t2 is the thickness of the individual first heat dissipation fin, p is the pitch specified in the design drawing, and ε2 is the compression ratio of the object dedicated to heat dissipation.)

When a seating platform of the sample seating part is tilted at the second angle by using a controller of the heat dissipation plate manufacturing apparatus, in the zero point adjustment, in a situation in which a point is read as (x, y) in an X-Y Cartesian coordinate system dividing the seating platform into four quadrants before tilting the seating platform at the second angle, a point is read as (x', y') in an X'-Y' Cartesian coordinate system dividing the seating platform into four quadrants after tilting the seating platform at the second angle, and origins of the X-Y and X'-Y' Cartesian coordinate systems are aligned to each other so as to check a movement of "θ3" in the X'-Y' Cartesian coordinate system with respect to the X-Y Cartesian coordinate system, the X'-Y' Cartesian coordinate system may be synchronized with the X-Y Cartesian coordinate system by using a calculation program in the controller of the heat dissipation plate manufacturing apparatus using following two coordinate transformation formulas based on trigonometric functions.

$$x' = x\cos(\theta 3) - y\sin(\theta 3)$$

$$y' = x\sin(\theta 3) + y\cos(\theta 3)$$

In a situation in which a seating platform is provided on the sample seating part, a cutting tool is provided on the cutting mechanism part, and a heat dissipation plate with partially grouped heat dissipation fins is provided on the seating platform, the performing of the cutting processing may include: forming the heat dissipation plate with partially grouped heat dissipation fins into the heat dissipation plate with grouped heat dissipation fins through cutting a remaining processing region of a first heat dissipation substrate in the heat dissipation plate with partially grouped heat dissipation fins by repeatedly bringing the cutting tool into contact with the heat dissipation plate with partially grouped heat dissipation fins by using a controller of the heat dissipation plate manufacturing apparatus, wherein, in the heat dissipation plate with grouped heat dissipation fins, second heat dissipation fins may be provided on a second heat dissipation substrate.

In a situation in which a seating platform is provided on the sample seating part, a cutting tool is provided on the cutting mechanism part, and another object dedicated to heat dissipation is provided next to a heat dissipation plate with partially grouped heat dissipation fins on the seating platform, the performing of the cutting processing may include: forming the object dedicated to heat dissipation into the heat dissipation plate with grouped heat dissipation fins through cutting a processing region of the object dedicated to heat dissipation by repeatedly bringing the cutting tool into contact with the object dedicated to heat dissipation by using a controller of the heat dissipation plate manufacturing apparatus, wherein, in the heat dissipation plate with grouped heat dissipation fins, second heat dissipation fins may be provided on a second heat dissipation substrate.

In a state in which the heat dissipation plate with grouped heat dissipation fins is formed on a seating platform of the sample seating part, the checking of whether the final processing surface of the sample seating part has been reached may include: comparing a rotation count history of the seating platform with a total number of processing surfaces of the seating platform by using a controller of the heat dissipation plate manufacturing apparatus.

The method may include: finishing the operation of the heat dissipation plate manufacturing apparatus when the rotation count of the seating platform is equal to the total number of processing surfaces of the seating platform.

The method may include: proceeding to a subsequent process from the (G) process by using the controller of the heat dissipation plate manufacturing apparatus when the rotation count of the seating platform is less than the total number of processing surfaces of the seating platform.

The subsequent process may include: (H) increasing a sequence order of a current processing surface of the seating platform by using the heat dissipation plate manufacturing apparatus; and (I) checking whether an error occurs on the heat dissipation plate with grouped heat dissipation fins by using the heat dissipation plate manufacturing apparatus.

The increasing of the sequence order of the current processing surface of the seating platform may include: adding "1" to the sequence order of the current processing surface of the seating platform by using the controller of the heat dissipation plate manufacturing apparatus.

In a situation in which a thickness specified in a design, a height specified in the design, and a pitch specified in the design are prestored in an image pitch for second heat dissipation fins of the heat dissipation plate with grouped heat dissipation fins in the controller of the heat dissipation plate manufacturing apparatus, in the checking of whether the error occurs on the heat dissipation plate with grouped heat dissipation fins, the heat dissipation plate with grouped heat dissipation fins may be captured by using a camera of the heat dissipation plate manufacturing apparatus, the controller of the heat dissipation plate manufacturing apparatus may receive a captured image of the heat dissipation plate with grouped heat dissipation fins from the camera, the controller of the heat dissipation plate manufacturing apparatus may extract an image thickness, an image height, and the image pitch of the second heat dissipation fins from the captured image of the heat dissipation plate with grouped heat dissipation fins, and the controller of the heat dissipation plate manufacturing apparatus may compare the image thickness, the image height, and the image pitch with the thickness specified in the design, the height specified in the design, and the pitch specified in the design.

The method may include: proceeding from the (H) process to the (C) process and performing the (C) process when the image thickness, the image height, and the image pitch are different from the thickness specified in the design, the height specified in the design, and the pitch specified in the design.

The method may include: proceeding from the (H) process to the (D) process and performing the (D) process when the image thickness, the image height, and the image pitch are equal to the thickness specified in the design, the height specified in the design, and the pitch specified in the design.

The sample seating part may have a motor and a seating platform that is linked to a rotation of a rotation shaft of the motor, and the seating platform may be formed in a polygonal shape with at least three sides when the seating platform is viewed from one side portion of the seating platform.

The method for using the heat dissipation plate manufacturing apparatus according to the present disclosure is configured as follows.

The heat dissipation plate manufacturing apparatus has the base platform and the sliding platform that are positioned perpendicular to each other, and has the sample seating part and the cutting mechanism part that are configured to be respectively slid along the base platform and the sliding platform.

The inclination of the seating platform is adjusted through the motor in the sample seating part by using the controller of the heat dissipation plate manufacturing apparatus.

The thickness and shape of the heat dissipation fins in the heat dissipation plate with grouped heat dissipation fins are measured and captured through the thickness sensor and the camera of the heat dissipation plate manufacturing apparatus.

The positions of the seating platform before and after the rotation of the seating platform are linked by the coordinate transformation formulas by using the controller of the heat dissipation plate manufacturing apparatus even when there is a positional difference before and after the rotation.

Before and after the object dedicated to heat dissipation is seated, the user's intervention in measuring and adjusting the inclination of the seating platform in the sample seating part is capable of being minimized. Furthermore, even when determining whether there is an error between the processed shape of the heat dissipation fins and the shape specified in the design of the heat dissipation fins is performed, the user's intervention in measuring the thickness, height, and pitch of the heat dissipation fins in the heat dissipation plate with grouped heat dissipation fins is capable of being minimized.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, in order to enable those skilled in the art to easily implement the present disclosure, various exemplary embodiments of the present disclosure will be described in detail with reference to the accompanying drawings.

Figure 1:
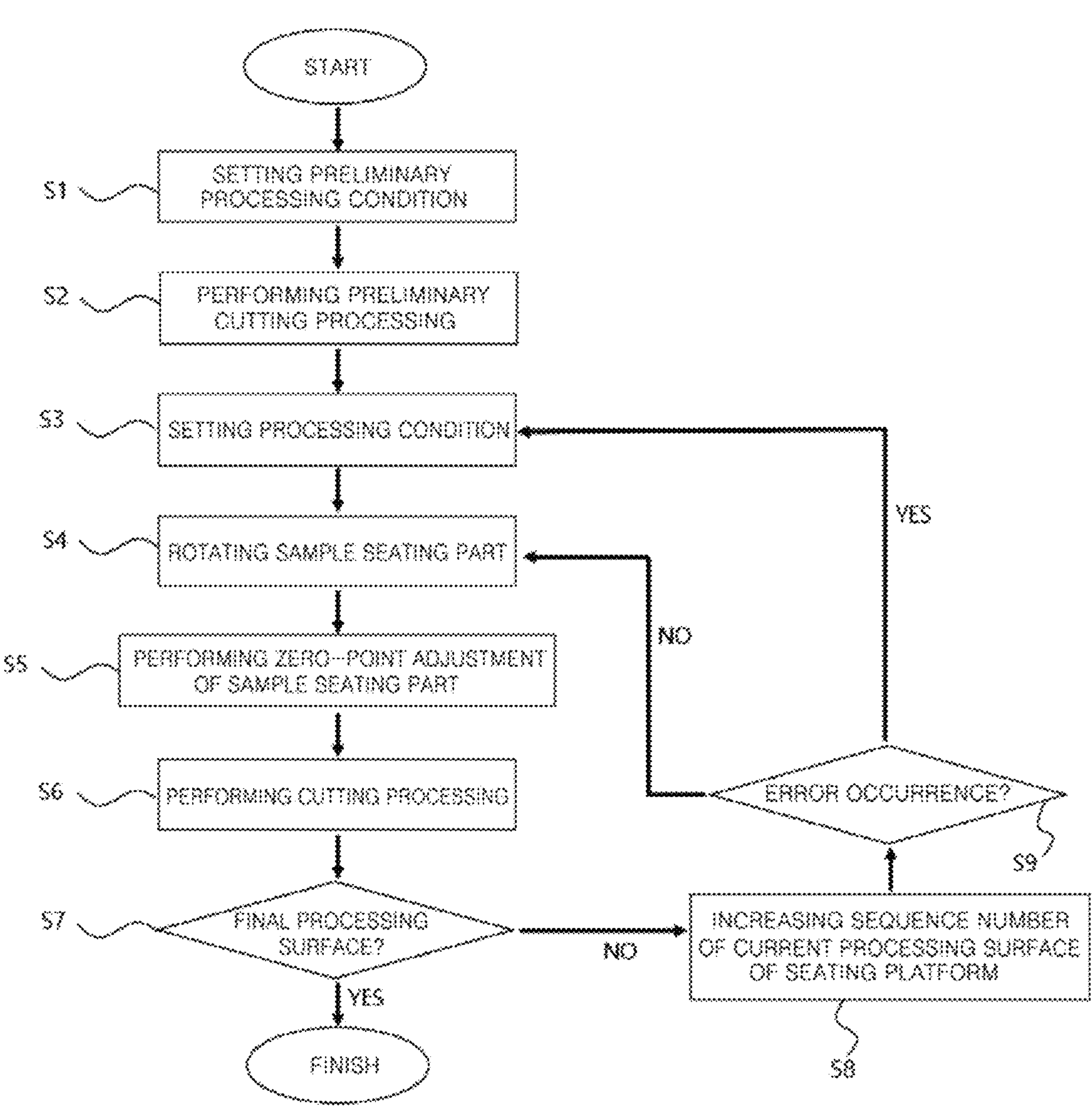
FIG. 1 is a flowchart showing a method for using a heat dissipation plate manufacturing apparatus according to the present disclosure.
Figure 2:
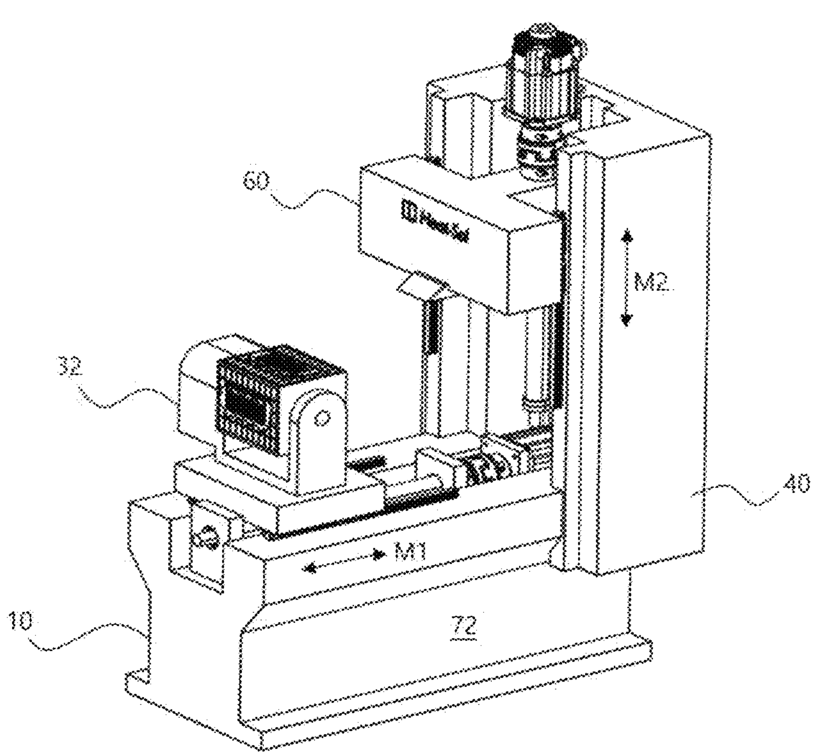
FIG. 2 is a perspective view illustrating the heat dissipation plate manufacturing apparatus according to the present disclosure.
Figure 3:
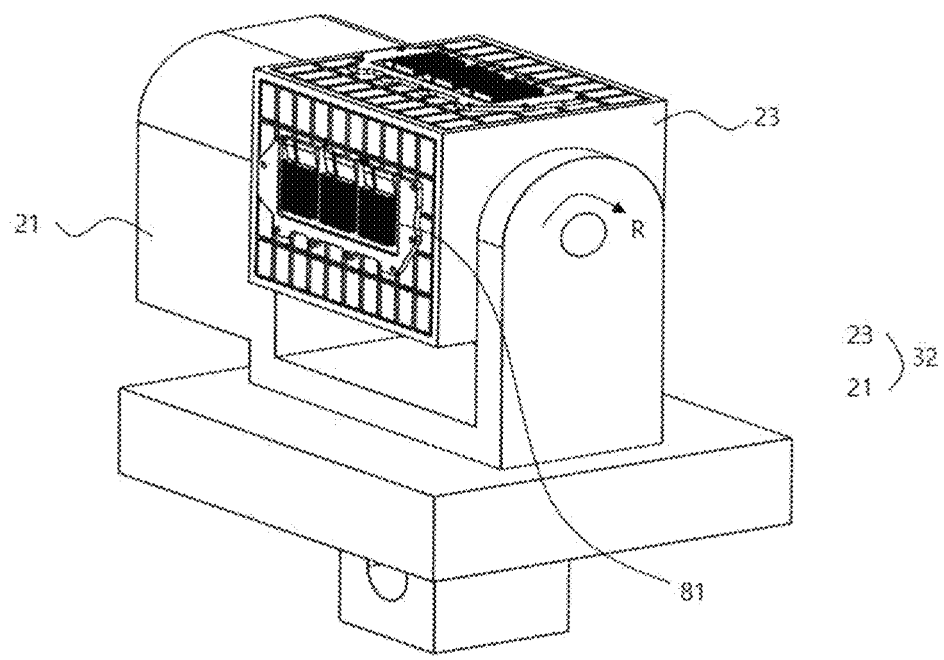
FIG. 3 is a perspective view illustrating a sample seating part in the heat dissipation plate manufacturing apparatus in FIG. 2.

FIG. 1 is a flowchart showing a method for using a heat dissipation plate manufacturing apparatus according to the present disclosure, FIG. 2 is a perspective view illustrating the heat dissipation plate manufacturing apparatus according to the present disclosure, and FIG. 3 is a perspective view illustrating a sample seating part in the heat dissipation plate manufacturing apparatus in FIG. 2.

Figure 4:
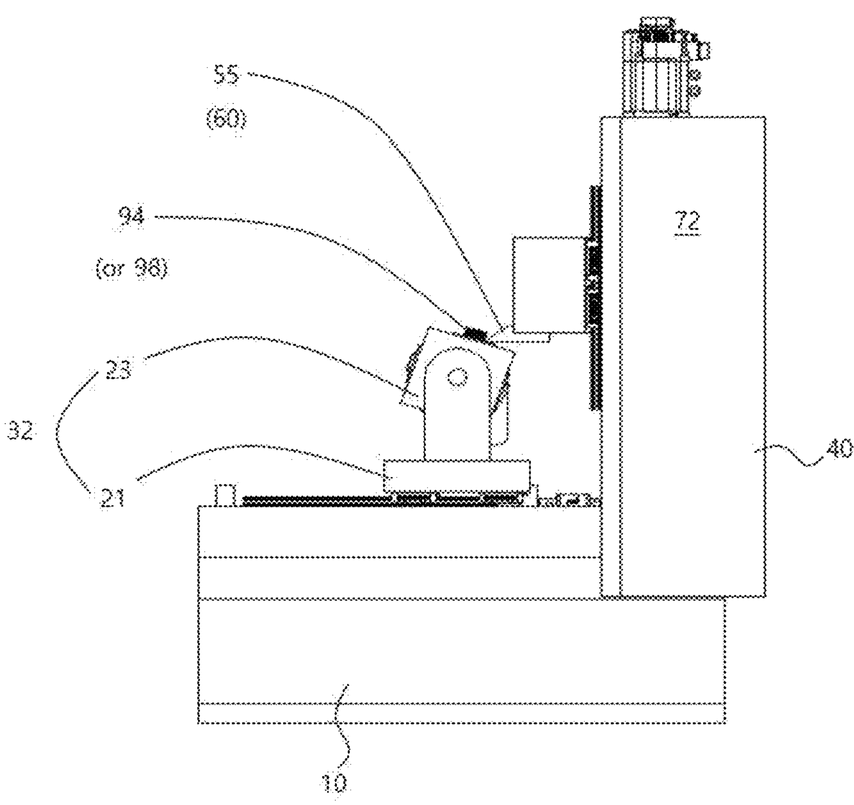
FIG. 4 is a side view illustrating a position relationship between the sample seating part and a cutting mechanism part during operating the heat dissipation plate manufacturing apparatus in FIG. 2.
Figure 5:
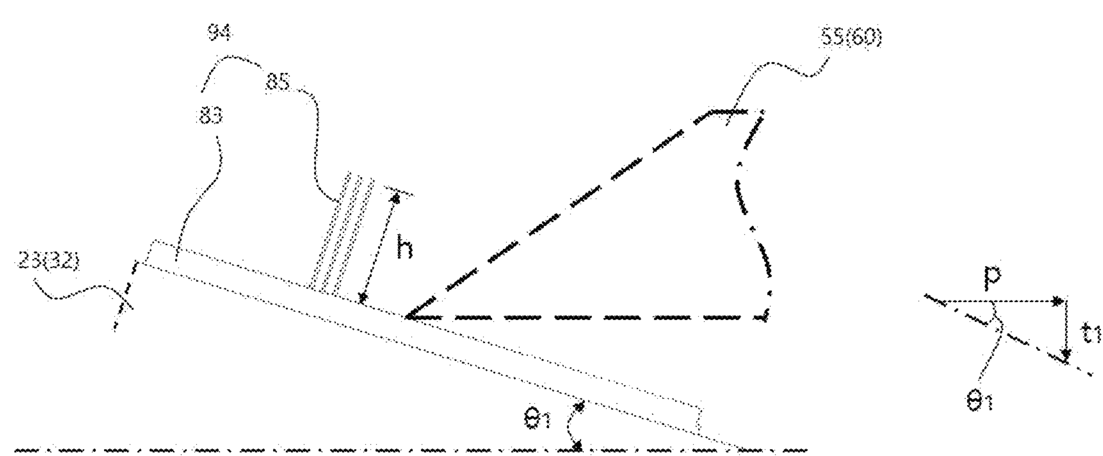
FIG. 5 is a side view illustrating a position relationship between a seating platform, a heat dissipation plate with partially grouped heat dissipation fins, and a cutting tool in a preliminary cutting processing during operating the heat dissipation plate manufacturing apparatus in FIG. 2.

FIG. 4 is a side view illustrating a position relationship between the sample seating part and a cutting mechanism part during operating the heat dissipation plate manufacturing apparatus in FIG. 2, and FIG. 5 is a side view illustrating a position relationship between a seating platform, a heat dissipation plate with partially grouped heat dissipation fins, and a cutting tool in a preliminary cutting processing during operating the heat dissipation plate manufacturing apparatus in FIG. 2.

Figure 6:
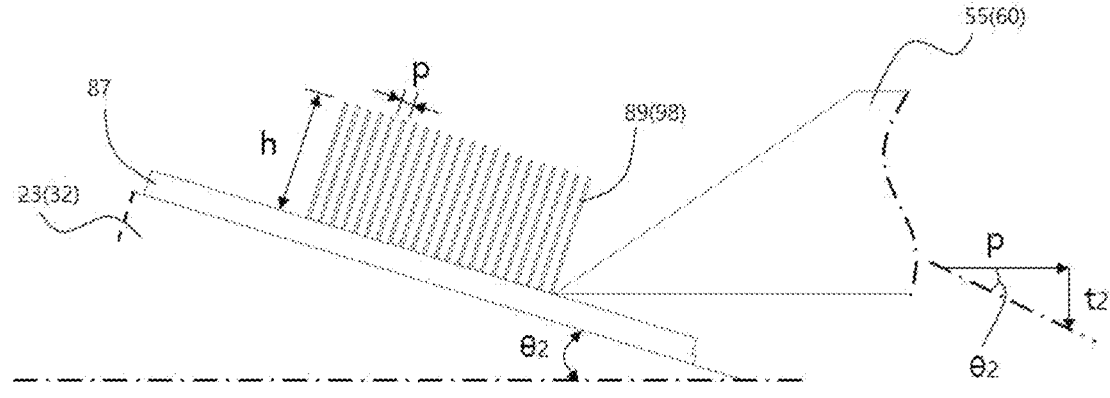
FIG. 6 is a side view illustrating a position relationship between the seating platform, a heat dissipation plate with grouped heat dissipation fins, and the cutting tool in a cutting processing during operating the heat dissipation plate manufacturing apparatus in FIG. 2.
Figure 7:
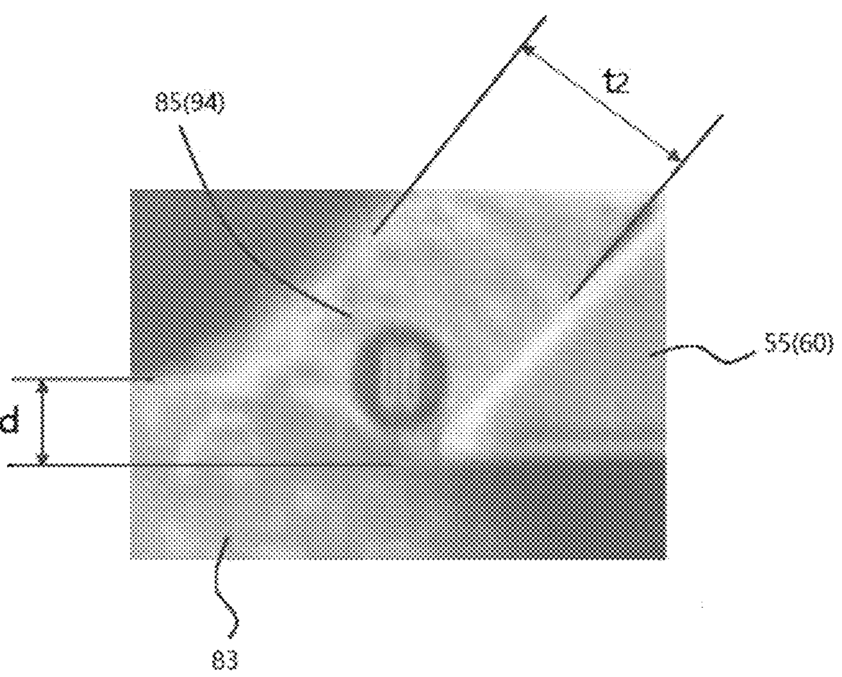
FIG. 7 is a photograph showing a position relationship between a first heat dissipation substrate, a first heat dissipation fin, and the cutting tool in the preliminary cutting processing in FIG. 5.

FIG. 6 is a side view illustrating a position relationship between the seating platform, a heat dissipation plate with grouped heat dissipation fins, and the cutting tool in a cutting processing during operating the heat dissipation plate manufacturing apparatus in FIG. 2, and FIG. 7 is a photograph showing a position relationship between a first heat dissipation substrate, a first heat dissipation fin, and the cutting tool in the preliminary cutting processing in FIG. 5.

Figure 8:
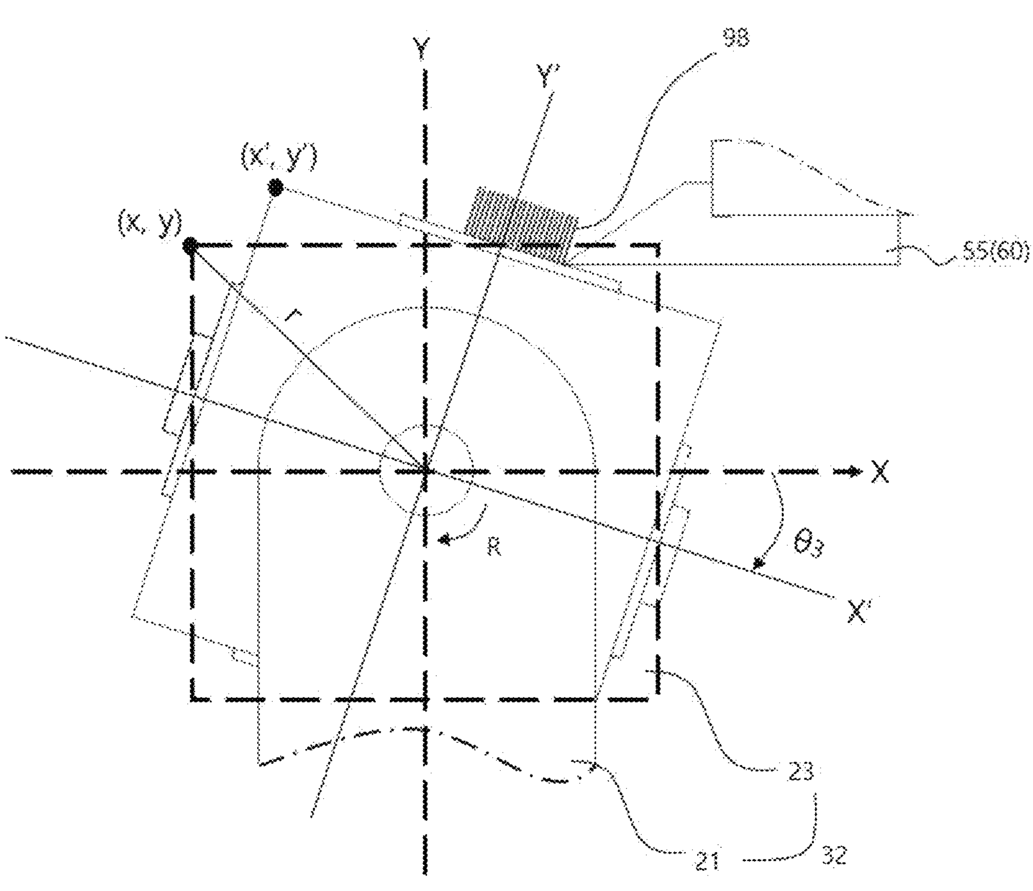
FIG. 8 is a cross-sectional view illustrating two Cartesian coordinate systems before and after a rotation of the seating platform in the cutting processing in FIG. 6.

In addition, FIG. 8 is a cross-sectional view illustrating two Cartesian coordinate systems before and after a rotation of the seating platform in the cutting processing in FIG. 6.

Referring to FIG. 1 to FIG. 8, a method for using a heat dissipation plate manufacturing apparatus according to the present disclosure is performed such that an object dedicated to heat dissipation is processed and manufactured into a heat dissipation plate with grouped heat dissipation fins.

To this end, the method for using the heat dissipation plate manufacturing apparatus includes (A) setting a preliminary processing condition on a heat dissipation plate manufacturing apparatus 72 S1, and (B) performing a preliminary cutting processing to an object 81 dedicated to heat dissipation on a sample seating part (see reference numeral 32 in FIG. 2) by using the heat dissipation plate manufacturing apparatus 72 on the basis of the preliminary processing condition S2.

Furthermore, the method for using the heat dissipation plate manufacturing apparatus includes (C) setting a processing condition on the heat dissipation plate manufacturing apparatus 72 S3, (D) rotating the sample seating part 32 by using the heat dissipation plate manufacturing apparatus 72 on the basis of the processing condition S4, and (E) performing zero-point adjustment of the sample seating part 32 by using the heat dissipation plate manufacturing apparatus 72 S5.

Furthermore, the method for using the heat dissipation plate manufacturing apparatus includes (F) performing a cutting processing on the object 81 dedicated to heat dissipation by using the heat dissipation plate manufacturing apparatus 72 on the basis of the processing condition S6, and (G) checking whether a final processing surface of the sample seating part 32 has been reached by using the heat dissipation plate manufacturing apparatus 72 S7. Here, in the cutting processing, the object 81 dedicated to heat dissipation is formed into a heat dissipation plate 98 with grouped heat dissipation fins.

Referring to FIG. 2 and FIG. 3, the heat dissipation plate manufacturing apparatus 72 includes a base platform 10 which is positioned on a lower side of the heat dissipation plate manufacturing apparatus 72 and which extends horizontally, the sample seating part 32 configured to be slid on the base platform 10 along the base platform 10, a sliding platform 40 which is positioned on an upper side of the heat dissipation plate manufacturing apparatus 72 and which extends vertically with respect to the base platform 10, and a cutting mechanism part 60 configured to be slid along the sliding platform 40.

Referring to FIG. 2 and FIG. 4, the sample seating part 32 and the cutting mechanism part 60 are configured to be gathered around an edge between the base platform 10 and the sliding platform 40 or to deviate from the edge during operating the heat dissipation plate manufacturing apparatus 72. Referring to FIG. 3, the sample seating part 32 includes a motor 21 and a seating platform 23 which has a polygonal shape (for example, a rectangular shape) and which is linked to a rotation R of a rotation shaft of the motor 21.

In the setting the preliminary processing condition S1, referring to FIG. 2 and FIG. 3, positioning the object 81 dedicated to heat dissipation on the seating platform 23 and inputting a condition probe thickness, a pitch specified in a design drawing, a height specified in the design drawing, a condition probe compression ratio, and a total number of condition probe fins into a user interface (not illustrated in the drawings) of the heat dissipation plate manufacturing apparatus 72 is included. Furthermore, in the setting the preliminary processing condition S1, referring to FIG. 4 and FIG. 5, tilting the seating platform 23 at a first angle θ1 with respect to the base platform 10 on the basis of the condition probe thickness t1, the pitch p specified in the design drawing, and the condition probe compression ratio E1 by using a controller (not illustrated in the drawings) of the heat dissipation plate manufacturing apparatus 72 is included.

In FIG. 5, the condition probe thickness t1 is a one-time movement distance of the cutting mechanism part 60 on the sliding platform 40. In FIG. 5, the pitch p specified in the design drawing is a one-time movement distance of the sample seating part 32 on the base platform 10. The condition probe thickness t1 and the condition probe compression ratio E1 are secured from use experience data of the heat dissipation plate manufacturing apparatus 72.

Referring to FIG. 5, the first angle θ1 is derived from a following angle derivation formula within a calculation program in the controller of the heat dissipation plate manufacturing apparatus 72.

$$\theta 1 = \arctan\left(t1/p/\varepsilon 1\right)$$

(Here, t1 is the condition probe thickness, p is the pitch specified in the design drawing, and ε1 is the condition probe compression ratio.)

Next, referring to FIG. 2 or FIG. 3, the seating platform 23 is provided on the sample seating part 32, a cutting tool 55 is provided on the cutting mechanism part 60, and the condition probe thickness t1, the pitch p specified in the design drawing, the height h specified in the design drawing, the condition probe compression ratio ε1, and the total number of condition probe fins (not illustrated in the drawing) of a preliminary heat dissipation fin 85 are input into the user interface of the heat dissipation plate manufacturing apparatus 72.

In this situation, in the performing of the preliminary cutting processing S2, referring to FIG. 4 and FIG. 5, gathering the sample seating part 32 and the cutting mechanism part 60 around the edge between the base platform 10 and the sliding platform 40 by using the controller of the heat dissipation plate manufacturing apparatus 72, and forming a heat dissipation plate 94 with partially grouped heat dissipation fins by cutting a portion of the object 81 dedicated to heat dissipation according to the total number of condition probe fins by repeatedly bringing the cutting tool 55 into contact with the object 81 dedicated to heat dissipation on the seating platform 23 are included.

Next, referring to FIG. 4 and FIG. 5, the seating platform 23 is provided on the sample seating part 32, the cutting tool 55 is provided on the cutting mechanism part 60, and the heat dissipation plate 94 with partially grouped heat dissipation fins is formed from the object 81 dedicated to heat dissipation provided on the seating platform 23.

In this situation, in the setting the processing condition S3, referring to FIG. 4 to FIG. 7, in a state in which the cutting tool 55 is brought into contact with an individual first heat dissipation fin 85 among the first heat dissipation fins 85 positioned on a first heat dissipation substrate 83 in the heat dissipation plate 94 with partially grouped heat dissipation fins, a thickness t2 of the individual first heat dissipation fin 85 among the first heat dissipation fins in the heat dissipation plate 94 with partially grouped heat dissipation fins is measured by using a thickness sensor (not illustrated in the drawings) of the heat dissipation plate manufacturing apparatus 72.

Furthermore, a penetration depth d of a tip blade of the cutting tool 55 under the individual first heat dissipation fin 85 is measured between the first heat dissipation substrate 83 and the individual first heat dissipation fin 85 by using the thickness sensor of the heat dissipation plate manufacturing apparatus 72, and a compression ratio ε2 of the object 81 dedicated to heat dissipation is derived in the controller of the heat dissipation plate manufacturing apparatus 72 by receiving the thickness t2 of the individual first heat dissipation fin 85 and the penetration depth d of the tip blade as numerical values from the thickness sensor.

The compression ratio ε2 is derived from a following compression ratio derivation formula within the calculation program in the controller of the heat dissipation plate manufacturing apparatus 72.

$$\varepsilon 2 = t2/d$$

(Here, t2 is the thickness of the individual first heat dissipation fin, d is the penetration depth of the tip blade, and ε2 is the compression ratio of the object dedicated to heat dissipation.)

In addition, the setting of the processing condition S3 further includes capturing the seating platform 23 by using a camera (not illustrated in the drawings) of the heat dissipation plate manufacturing apparatus 72, and storing a total number of processing surfaces of the seating platform 23 as a numerical value by receiving a captured image of the seating platform 23 from the camera of the heat dissipation plate manufacturing apparatus 72. In this situation, the total number of processing surfaces of the seating platform 23 is four. The controller of the heat dissipation plate manufacturing apparatus 72 may determine a processing sequence order of the processing surfaces of the seating platform 23 according to the total number of processing surfaces and a rotation direction R of the seating platform 23.

Next, referring to FIG. 4 to FIG. 7, the seating platform 23 is provided on the sample seating part 32, the cutting tool 55 is provided on the cutting mechanism part 60, and the compression ratio ε2 of the object 81 dedicated to heat dissipation is derived in the controller of the heat dissipation plate manufacturing apparatus 72 by receiving the thickness t2 of the individual first heat dissipation fin 85 and the penetration depth d of the tip blade of the cutting tool 55 as the numerical values.

In this situation, referring to FIG. 5 and FIG. 6, in a state in which the pitch p specified in the design drawing and the height h specified in the design drawing are already input during performing the (A) process in the controller of the heat dissipation plate manufacturing apparatus 72, the rotating of the sample seating part 32 S4 includes tilting the seating platform 23 at a second angle θ2 by using the controller of the heat dissipation plate manufacturing apparatus 72 on the basis of the pitch p specified in the design drawing, the thickness t2 of the first heat dissipation fin 85, and the compression ratio ε2 of the object 81 dedicated to heat dissipation.

The second angle θ2 is derived from a following angle derivation formula within the calculation program in the controller of the heat dissipation plate manufacturing apparatus 72.

$$\theta 2=\arctan\left(t2/p/\varepsilon 2\right)$$

(Here, t2 is the thickness of the first heat dissipation fin, p is the pitch specified in the design drawing, and ¿2 is the compression ratio of the object dedicated to heat dissipation.)

Here, referring to FIG. 8, when the seating platform 23 is tilted at the second angle θ2 by using the controller of the heat dissipation plate manufacturing apparatus 72, the zero point adjustment is performed in the controller of the heat dissipation plate manufacturing apparatus 72 such that a point is read as (x, y) in the X-Y Cartesian coordinate system dividing the seating platform 23 into four quadrants before tilting the seating platform 23 at the second angle θ2, a point is read as (x', y') in the X'-Y' Cartesian coordinate system dividing the seating platform 23 into four quadrants after tilting the seating platform 23 at the second angle θ2, and origins of the X-Y and X'-Y' Cartesian coordinate systems are aligned to each other so as to check a movement of "θ3" in the X'-Y' Cartesian coordinate system with respect to the X-Y Cartesian coordinate system.

Furthermore, the X'-Y' Cartesian coordinate system is synchronized with the X-Y Cartesian coordinate system by using the calculation program in the controller of the heat dissipation plate manufacturing apparatus using following two coordinate transformation formulas based on trigonometric functions.

$$x'=x\cos(\theta 3)-y\sin(\theta 3)$$

$$y'=x\sin(\theta 3)+y\cos(\theta 3)$$

Here, by using the coordinate transformation formulas, the controller of the heat dissipation plate manufacturing apparatus 72 may adjust or set a position relationship between the seating platform 23 and the cutting tool 55 on the seating platform 23, a movement distance of the cutting tool 55 with respect to the seating platform 23, or a size of a structure (for example, a second heat dissipation fin) that is subsequently formed on the seating platform 23. Next, referring to FIG. 4 to FIG. 6, the seating platform 23 is provided on the sample seating part 32, the cutting tool 55 is provided on the cutting mechanism part 60, and the heat dissipation plate 94 with partially grouped heat dissipation fins is provided on the seating platform 23.

In this situation, referring to FIG. 4 to FIG. 6, the performing of the cutting processing S6 includes forming the heat dissipation plate 94 with partially grouped heat dissipation fins into the heat dissipation plate 98 with grouped heat dissipation fins through cutting a remaining processing region of the first heat dissipation substrate 83 in the heat dissipation plate 94 with partially grouped heat dissipation fins by repeatedly bringing the cutting tool 55 into contact with the heat dissipation plate 94 with partially grouped heat dissipation fins by using the controller of the heat dissipation plate manufacturing apparatus 72. Referring to FIG. 6, in the heat dissipation plate 98 with grouped heat dissipation fins, second heat dissipation fins 90 are provided on a second heat dissipation substrate 87.

Alternatively, referring to FIG. 3 to FIG. 6, the seating platform 23 is provided on the sample seating part 32, the cutting tool 55 is provided on the cutting mechanism part 60, and another object 81 dedicated to heat dissipation may be provided next to the heat dissipation plate 94 with partially grouped heat dissipation fins on the seating platform 23.

In this situation, referring to FIG. 3 to FIG. 6, the performing of the cutting processing S6 includes forming object 81 dedicated to heat dissipation into the heat dissipation plate 98 with grouped heat dissipation fins through cutting a processing region of the object 81 dedicated to heat dissipation by repeatedly bringing the cutting tool 55 into contact with the object 81 dedicated to heat dissipation by using the controller of the heat dissipation plate manufacturing apparatus 72. In the heat dissipation plate 98 with grouped heat dissipation fins, the second heat dissipation fins 90 are provided on the second heat dissipation substrate 87.

Next, referring to FIG. 3 and FIG. 6, in a state in which the heat dissipation plate 98 with grouped heat dissipation fins is formed on the seating platform 23, the checking of whether the final processing surface of the sample seating part 32 has been reached S7 includes comparing a rotation count history of the seating platform 23 with the total number of processing surfaces of the seating platform 23 by using the controller of the heat dissipation plate manufacturing apparatus 72. Here, referring to FIG. 1, the method for using the heat dissipation plate manufacturing apparatus includes finishing the operation of the heat dissipation plate manufacturing apparatus 72 when the rotation count of the seating platform 23 is equal to the total number of processing surfaces of the seating platform 23.

Alternatively, referring to FIG. 1, the method for using the heat dissipation plate manufacturing apparatus includes proceeding to a subsequent process from the (G) process by using the controller of the heat dissipation plate manufacturing apparatus 72 when the rotation count of the seating platform 23 is less than the total number of processing surfaces of the seating platform 23.

Referring to FIG. 1, the subsequent process includes (H) increasing a sequence order of a current processing surface of the seating platform by using the heat dissipation plate manufacturing apparatus S8, and includes (I) checking whether an error occurs on the heat dissipation plate with grouped heat dissipation fins by using the heat dissipation plate manufacturing apparatus S9. The increasing of the sequence order of the current processing surface of the seating platform 23 S8 includes adding "1" to the sequence order of the current processing surface of the seating platform 23 by using the controller of the heat dissipation plate manufacturing apparatus 72.

Next, referring to FIGS. 4 and 6, in the controller of the heat dissipation plate manufacturing apparatus 72, a thickness specified in a design, a height specified in the design, and a pitch specified in the design are prestored in an image pitch for the second heat dissipation fins 89 of the heat dissipation plate 98 with grouped heat dissipation fins.

In this situation, referring to FIG. 4 and FIG. 6, in the checking of whether the error occurs on the heat dissipation plate with grouped heat dissipation fins S9, the heat dissipation plate 98 with grouped heat dissipation fins is captured by using the camera (not illustrated in the drawings) of the heat dissipation plate manufacturing apparatus 72, the controller of the heat dissipation plate manufacturing apparatus 72 receives a captured image of the heat dissipation plate 98 with grouped heat dissipation fins from the camera, the controller of the heat dissipation plate manufacturing apparatus 72 extracts an image thickness, an image height, and the image pitch of the second heat dissipation fins 98 from the captured image of the heat dissipation plate 98 with grouped heat dissipation fins, and the controller of the heat dissipation plate manufacturing apparatus 72 compares the image thickness, the image height, and the image pitch with the thickness specified in the design, the height specified in the design, and the pitch specified in the design.

Here, referring to FIG. 1, the method for using the heat dissipation plate manufacturing apparatus includes proceeding from the (H) process to the (C) process and performing the (C) process when the image thickness, the image height, and the image pitch are different from the thickness specified in the design, the height specified in the design, and the pitch specified in the design. Alternatively, referring to FIG. 1, the method for using the heat dissipation plate manufacturing apparatus includes proceeding from the (H) process to the (D) process and performing the (D) process when the image thickness, the image height, and the image pitch are equal to the thickness specified in the design, the height specified in the design, and the pitch specified in the design.

Figure 9:
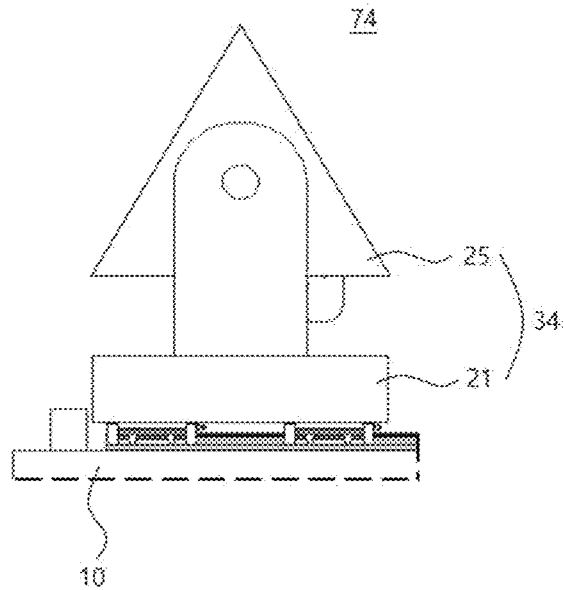
FIG. 9 is a perspective view illustrating a first modification example of the heat dissipation plate manufacturing apparatus in FIG. 2.
Figure 10:
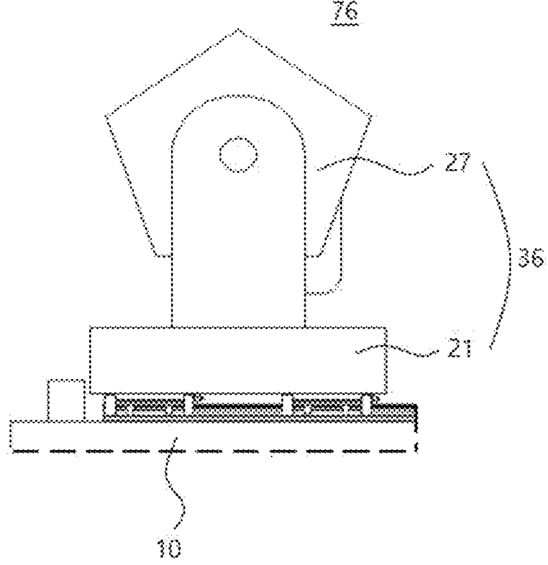
FIG. 10 is a perspective view illustrating a second modification example of the heat dissipation plate manufacturing apparatus in FIG. 2.
Figure 11:
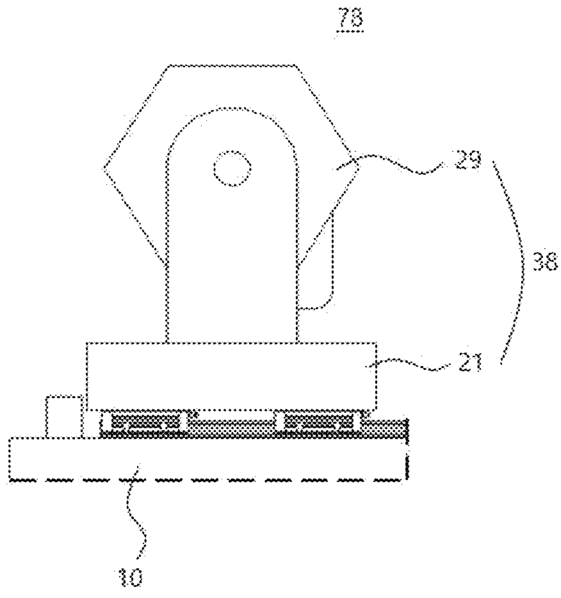
FIG. 11 is a perspective view illustrating a third modification example of the heat dissipation plate manufacturing apparatus in FIG. 2.

FIG. 9 perspective view illustrating a first modification example of the heat dissipation plate manufacturing apparatus in FIG. 2, FIG. 10 is a perspective view illustrating a second modification example of the heat dissipation plate manufacturing apparatus in FIG. 2, and FIG. 11 is a perspective view illustrating a third modification example of the heat dissipation plate manufacturing apparatus in FIG. 2.

Referring to FIG. 9 to FIG. 11, the heat dissipation plate manufacturing apparatus 72 may be replaced with a heat dissipation plate manufacturing apparatus 74, 76, or 78 according to the first, second, or third modification example. In the heat dissipation plate manufacturing apparatus 74, 76, or 78, a sample seating part 34, 36, or 38 has the motor 21, and has a seating platform 25, 27, or 29 linked to a rotation of a rotation shaft of the motor 21. Here, the seating platform 25, 27, or 29 may be formed in a polygonal shape with at least three sides when viewed from one side portion of the seating platform 25, 27, or 29.

What is claimed is:

1. A method for using a heat dissipation plate manufacturing apparatus configured to manufacture an object dedicated to heat dissipation into a heat dissipation plate with grouped heat dissipation fins by processing the object dedicated to heat dissipation, the method comprising:

(A) setting a preliminary processing condition on the heat dissipation plate manufacturing apparatus;

(B) performing a preliminary cutting processing to the object dedicated to heat dissipation on a sample seating part by using the heat dissipation plate manufacturing apparatus on the basis of the preliminary processing condition;

(C) setting a processing condition on the heat dissipation plate manufacturing apparatus;

(D) rotating the sample seating part by using the heat dissipation plate manufacturing apparatus on the basis of the processing condition;

(E) performing zero-point adjustment of the sample seating part by using the heat dissipation plate manufacturing apparatus;

(F) performing a cutting processing on the object dedicated to heat dissipation by using the heat dissipation plate manufacturing apparatus on the basis of the processing condition; and (G) checking whether a final processing surface of the sample seating part has been reached by using the heat dissipation plate manufacturing apparatus, wherein, in the cutting processing, the object dedicated to heat dissipation is formed into the heat dissipation plate with grouped heat dissipation fins.

2. The method of claim 1, wherein the heat dissipation plate manufacturing apparatus comprises:

a base platform which is positioned on a lower side of the heat dissipation plate manufacturing apparatus and which extends horizontally;

the sample seating part configured to be slid on the base platform along the base platform;

a sliding platform which is positioned on an upper side of the heat dissipation plate manufacturing apparatus and which extends vertically with respect to the base platform; and a cutting mechanism part configured to be slid along the sliding platform, wherein the sample seating part and the cutting mechanism part are configured to be gathered around an edge between the base platform and the sliding platform or to deviate from the edge during operating the heat dissipation plate manufacturing apparatus.

3. The method of claim 2, wherein the sample seating part comprises:

a motor; and a seating platform which is formed in a polygonal shape and which is linked to a rotation of a rotation shaft of the motor, wherein the setting of the preliminary processing condition comprises:

positioning the object dedicated to heat dissipation on the seating platform;

inputting a condition probe thickness, a pitch specified in a design drawing, a height specified in the design drawing, a condition probe compression ratio, and a total number of condition probe fins into a user interface of the heat dissipation plate manufacturing apparatus; and tilting the seating platform at a first angle with respect to the base platform on the basis of the condition probe thickness, the pitch specified in the design drawing, and the condition probe compression ratio by using a controller of the heat dissipation plate manufacturing apparatus.

4. The method of claim 3, wherein the condition probe thickness is a one-time movement distance of the cutting mechanism part on the sliding platform, the pitch specified in the design drawing is a one-time movement distance of the sample seating part on the base platform, and the condition probe thickness and the condition probe compression ratio are secured from use experience data of the heat dissipation plate manufacturing apparatus.

5. The method of claim 3, wherein the first angle is derived from a following angle derivation formula within a calculation program in the controller of the heat dissipation plate manufacturing apparatus, $$\theta 1 = \arctan\left(t1/p/\varepsilon 1\right)$$

here, t1 is the condition probe thickness, p is the pitch specified in the design drawing, and ε1 is the condition probe compression ratio.

6. The method of claim 2, wherein, in a situation in which a seating platform is provided on the sample seating part, a cutting tool is provided on the cutting mechanism part, and a condition probe thickness, a pitch specified in a design drawing, a height specified in the design drawing, a condition probe compression ratio, and a total number of condition probe fins of a preliminary heat dissipation fin are input into a user interface of the heat dissipation plate manufacturing apparatus, the performing of the preliminary cutting processing comprises:

gathering the sample seating part and the cutting mechanism part around the edge between the base platform and the sliding platform by using a controller of the heat dissipation plate manufacturing apparatus; and forming a heat dissipation plate with partially grouped heat dissipation fins by cutting a portion of the object dedicated to heat dissipation according to the total number of condition probe fins by repeatedly bringing the cutting tool into contact with the object dedicated to heat dissipation on the seating platform by using the controller.

7. The method of claim 2, wherein, in a situation in which a seating platform is provided on the sample seating part, a cutting tool is provided on the cutting mechanism part, and a heat dissipation plate with partially grouped heat dissipation fins is formed from the object dedicated to heat dissipation provided on the seating platform, in the setting of the processing condition, in a state in which the cutting tool is brought into contact with an individual first heat dissipation fin among first heat dissipation fins positioned on a first heat dissipation substrate in the heat dissipation plate with partially grouped heat dissipation fins, a thickness of the individual first heat dissipation fin among the first heat dissipation fins in the heat dissipation plate with partially grouped heat dissipation fins is measured by using a thickness sensor of the heat dissipation plate manufacturing apparatus, a penetration depth of a tip blade of the cutting tool under the individual first heat dissipation fin is measured between the first heat dissipation substrate and the individual first heat dissipation fin by using the thickness sensor of the heat dissipation plate manufacturing apparatus, and a compression ratio of the object dedicated to heat dissipation is derived in a controller of the heat dissipation plate manufacturing apparatus by receiving the thickness of the individual first heat dissipation fin and the penetration depth of the tip blade as numerical values from the thickness sensor.

8. The method of claim 7, wherein the compression ratio is derived from a following compression ratio derivation formula within a calculation program in the controller of the heat dissipation plate manufacturing apparatus, $$\varepsilon 2 = t2/d$$

here, t2 is the thickness of the individual first heat dissipation fin, d is the penetration depth of the tip blade, and ε2 is the compression ratio of the object dedicated to heat dissipation.

9. The method of claim 7, further comprising:

capturing the seating platform by using a camera of the heat dissipation plate manufacturing apparatus; and storing a total number of processing surfaces of the seating platform as a numerical value by receiving a captured image of the seating platform from the camera of the heat dissipation plate manufacturing apparatus.

10. The method of claim 2, wherein, in a situation in which a seating platform is provided on the sample seating part, a cutting tool is provided on the cutting mechanism part, and a compression ratio of the object dedicated to heat dissipation is derived in a controller of the heat dissipation plate manufacturing apparatus by receiving a thickness of an individual first heat dissipation fin and a penetration depth of a tip blade of the cutting tool as numerical values, in a state in which a pitch specified in a design drawing and a height specified in the design drawing are already input during performing the (A) process in the controller of the heat dissipation plate manufacturing apparatus, the rotating of the sample seating part comprises:

tilting the seating platform at a second angle by using the controller of the heat dissipation plate manufacturing apparatus on the basis of the pitch specified in the design drawing, the thickness of the individual first heat dissipation fin, and the compression ratio of the object dedicated to heat dissipation.

11. The method of claim 10, wherein the second angle is derived from a following angle derivation formula within a calculation program in the controller of the heat dissipation plate manufacturing apparatus, $$\theta 2 = \arctan\left(t2/p/\varepsilon 2\right)$$

here, t2 is the thickness of the individual first heat dissipation fin, p is the pitch specified in the design drawing, and ε2 is the compression ratio of the object dedicated to heat dissipation.

12. The method of claim 2, wherein, when a seating platform of the sample seating part is tilted at the second angle by using a controller of the heat dissipation plate manufacturing apparatus, in the zero-point adjustment, in a situation in which a point is read as (x, y) in an X-Y Cartesian coordinate system dividing the seating platform into four quadrants before tilting the seating platform at the second angle, a point is read as (x', y') in an X'-Y' Cartesian coordinate system dividing the seating platform into four quadrants after tilting the seating platform at the second angle, and origins of the X-Y and X'-Y' Cartesian coordinate systems are aligned to each other so as to check a movement of "θ3" in the X'-Y' Cartesian coordinate system with respect to the X-Y Cartesian coordinate system, the X'-Y' Cartesian coordinate system is synchronized with the X-Y Cartesian coordinate system by using a calculation program in the controller of the heat dissipation plate manufacturing apparatus using following two coordinate transformation formulas based on trigonometric functions, $$x' = x\cos(\theta 3) - y\sin(\theta 3)$$

$$y' = x\sin(\theta 3) + y\cos(\theta 3).$$

13. The method of claim 2, wherein, in a situation in which a seating platform is provided on the sample seating part, a cutting tool is provided on the cutting mechanism part, and a heat dissipation plate with partially grouped heat dissipation fins is provided on the seating platform, the performing of the cutting processing comprises:

forming the heat dissipation plate with partially grouped heat dissipation fins into the heat dissipation plate with grouped heat dissipation fins through cutting a remaining processing region of a first heat dissipation substrate in the heat dissipation plate with partially grouped heat dissipation fins by repeatedly bringing the cutting tool into contact with the heat dissipation plate with partially grouped heat dissipation fins by using a controller of the heat dissipation plate manufacturing apparatus, wherein, in the heat dissipation plate with grouped heat dissipation fins, second heat dissipation fins are provided on a second heat dissipation substrate.

14. The method of claim 2, wherein, in a situation in which a seating platform is provided on the sample seating part, a cutting tool is provided on the cutting mechanism part, and another object dedicated to heat dissipation is provided next to a heat dissipation plate with partially grouped heat dissipation fins on the seating platform, the performing of the cutting processing comprises:

forming the object dedicated to heat dissipation into the heat dissipation plate with grouped heat dissipation fins through cutting a processing region of the object dedicated to heat dissipation by repeatedly bringing the cutting tool into contact with the object dedicated to heat dissipation by using a controller of the heat dissipation plate manufacturing apparatus, wherein, in the heat dissipation plate with grouped heat dissipation fins, second heat dissipation fins are provided on a second heat dissipation substrate.

15. The method of claim 2, wherein, in a state in which the heat dissipation plate with grouped heat dissipation fins is formed on a seating platform of the sample seating part, the checking of whether the final processing surface of the sample seating part has been reached comprises:

comparing a rotation count history of the seating platform with a total number of processing surfaces of the seating platform by using a controller of the heat dissipation plate manufacturing apparatus.

16. The method of claim 15, further comprising:

finishing the operation of the heat dissipation plate manufacturing apparatus when the rotation count of the seating platform is equal to the total number of processing surfaces of the seating platform.

17. The method of claim 15, comprising:

proceeding to a subsequent process from the (G) process by using the controller of the heat dissipation plate manufacturing apparatus when the rotation count of the seating platform is less than the total number of processing surfaces of the seating platform.

18. The method of claim 17, wherein the subsequent process comprises:

(H) increasing a sequence order of a current processing surface of the seating platform by using the heat dissipation plate manufacturing apparatus; and (I) checking whether an error occurs on the heat dissipation plate with grouped heat dissipation fins by using the heat dissipation plate manufacturing apparatus.

19. The method of claim 18, wherein the increasing of the sequence order of the current processing surface of the seating platform comprises:

adding "1" to the sequence order of the current processing surface of the seating platform by using the controller of the heat dissipation plate manufacturing apparatus.

20. The method of claim 18, in a situation in which a thickness specified in a design, a height specified in the design, and a pitch specified in the design are prestored in an image pitch for second heat dissipation fins of the heat dissipation plate with grouped heat dissipation fins in the controller of the heat dissipation plate manufacturing apparatus, in the checking of whether the error occurs on the heat dissipation plate with grouped heat dissipation fins, the heat dissipation plate with grouped heat dissipation fins is captured by using a camera of the heat dissipation plate manufacturing apparatus, the controller of the heat dissipation plate manufacturing apparatus receives a captured image of the heat dissipation plate with grouped heat dissipation fins from the camera, the controller of the heat dissipation plate manufacturing apparatus extracts an image thickness, an image height, and the image pitch of the second heat dissipation fins from the captured image of the heat dissipation plate with grouped heat dissipation fins, and the controller of the heat dissipation plate manufacturing apparatus compares the image thickness, the image height, and the image pitch with the thickness specified in the design, the height specified in the design, and the pitch specified in the design.

21. The method of claim 20, comprising:

proceeding from the (H) process to the (C) process and performing the (C) process when the image thickness, the image height, and the image pitch are different from the thickness specified in the design, the height specified in the design, and the pitch specified in the design.

22. The method of claim 20, comprising:

proceeding from the (H) process to the (D) process and performing the (D) process when the image thickness, the image height, and the image pitch are equal to the thickness specified in the design, the height specified in the design, and the pitch specified in the design.

23. The method of claim 2, wherein the sample seating part has a motor and a seating platform that is linked to a rotation of a rotation shaft of the motor, and the seating platform is formed in a polygonal shape with at least three sides when the seating platform is viewed from one side portion of the seating platform.

* * * * *